(12) United States Patent
Hahn et al.

(10) Patent No.: US 12,027,685 B2
(45) Date of Patent: Jul. 2, 2024

(54) CHANNEL FOR COOLING AT LEAST ONE BATTERY CELL AND METHOD FOR FORMING A CHANNEL

(71) Applicant: Lisa Draexlmaier GmbH, Vilsbiburg (DE)

(72) Inventors: Alexander Hahn, Roettenbach (DE); Michael Steckel, Vilsbiburg (DE); Peter Faltermeier, Landshut (DE); Stefan Seidl, Landshut (DE)

(73) Assignee: LISA DRÄXLMAIER GMBH, Vilsbiburg (DE)

( * ) Notice: Subject to any disclaimer, the term of this patent is extended or adjusted under 35 U.S.C. 154(b) by 102 days.

(21) Appl. No.: 17/590,861

(22) Filed: Feb. 2, 2022

(65) Prior Publication Data

US 2022/0247008 A1 Aug. 4, 2022

(51) Int. Cl.
| | |
|---|---|
| *H01M 10/6556* | (2014.01) |
| *H01M 10/613* | (2014.01) |
| *H01M 10/625* | (2014.01) |
| *H01M 50/204* | (2021.01) |
| *H01M 50/249* | (2021.01) |
| *H01M 50/528* | (2021.01) |

(52) U.S. Cl.
CPC ..... *H01M 10/6556* (2015.04); *H01M 10/613* (2015.04); *H01M 10/625* (2015.04); *H01M 50/204* (2021.01); *H01M 50/249* (2021.01); *H01M 50/528* (2021.01); *H01M 2220/20* (2013.01)

(58) Field of Classification Search
CPC ............. H01M 10/613; H01M 10/625; H01M 10/6556; H01M 10/6567; H01M 2220/20; H01M 50/204; H01M 50/209; H01M 50/249; H01M 50/528
See application file for complete search history.

(56) References Cited

U.S. PATENT DOCUMENTS

| | | | | |
|---|---|---|---|---|
| 2008/0026284 | A1 | 1/2008 | Fujii | |
| 2011/0033742 | A1* | 2/2011 | Maier | H01M 50/258 165/104.31 |
| 2020/0028224 | A1* | 1/2020 | Hofer | H01M 10/613 |
| 2023/0331119 | A1* | 10/2023 | Kardos | H01M 10/613 |

FOREIGN PATENT DOCUMENTS

| | | |
|---|---|---|
| DE | 102017201016 | 7/2018 |
| DE | 102018117601 | 1/2020 |

OTHER PUBLICATIONS

DE102019117601 English Language Equivelant.
DE102017201015 English Language Equivelant.
DE 10 2021 102 359.9 German Office Action.

* cited by examiner

*Primary Examiner* — Victoria H Lynch
(74) *Attorney, Agent, or Firm* — BelayIP

(57) ABSTRACT

A channel for cooling at least one battery cell is set out. The channel includes a first housing frame and a second housing frame. The first housing frame is connected to the second housing frame and a partially fluid-tight region is formed between the first housing frame 133 and the second housing frame by the shape and material properties of the first housing frame and the second housing frame. The partially fluid-tight region forms the channel and the channel is arranged to allow a coolant to flow through the channel.

14 Claims, 2 Drawing Sheets

CHANNEL FOR COOLING AT LEAST ONE BATTERY CELL AND METHOD FOR FORMING A CHANNEL

CROSS REFERENCE TO RELATED APPLICATIONS

This application claims priority to German Patent Application DE102021102359.9 filed on Feb. 2, 2021, the content of which is herein incorporated by reference.

BACKGROUND OF THE INVENTION

Field of the Invention

The present invention relates to a channel for cooling at least one battery cell. Furthermore, the present invention relates to a method for forming a cooling channel.

Description of Related Art

Electrically powered vehicles are driven by electric motors. The energy required to drive the electric motor is taken from a battery. The battery consists of several electrically interconnected battery modules. Each of the battery modules contains battery cells. When energy is drawn from the battery, a power loss occurs due to the electrical resistances and the associated power losses, for example an internal resistance of the battery cell or contact resistances. The power loss is converted into heat and causes all battery cells in the battery to heat up. To prevent overheating of the battery cells or even destruction of the battery due to the heat at a high-power loss, the heat must be dissipated. An electrically non-conductive coolant can be used to cool the battery cells. The coolant, such as transformer oil, circulates within the battery module and flows past a heated battery cell, absorbing its heat and removing the heat from the heated battery cell. This requires the use of a lot of coolant; however coolants are very expensive and heavy, affecting for example the price and weight of the battery module.

German patent application DE102018117601A1 describes a battery with at least one battery module, which has a plurality of electrically conductively interconnected cylindrical battery cells, and a temperature control device for temperature control of the battery cells with a container having a fluid space, into which the battery cells partially project and which has an inflow and an outflow for a liquid of a liquid circuit. The fluid is an electrically non-conductive fluid, and the container has a cell holder with a plurality of openings through which respective end faces of the battery cells of the at least one battery module project into the fluid space of the container and which enclose respective lateral surfaces of the battery cells in a fluid-tight manner. The cell holder has at least one further opening through which a contact element projects into the fluid space of the container and which encloses an outer surface of the contact element in a fluid-tight manner. A connecting device arranged in the fluid space of the container electrically connects the respective poles of the end faces of the battery cells projecting into the fluid space of the container to the contact element projecting into the container.

BRIEF SUMMARY OF THE INVENTION

One task of the present invention is therefore to provide simple cooling of battery cells using means that are simple in terms of design.

This and other tasks are solved by the objects of the independent claims. Advantageous further embodiments of the invention are indicated in the dependent claims, the description and the accompanying figures.

One aspect of the present invention relates to a channel for cooling at least one battery cell comprising a first housing frame and a second housing frame, wherein the first housing frame is connected to the second housing frame, and a partially fluid-tight region is formed between the first housing frame and the second housing frame by shape and material properties of the first housing frame and the second housing frame, the partially fluid-tight region forming the channel, and the channel is adapted to allow a coolant to flow through the channel. By providing the channel for cooling when connecting the first housing frame to the second housing frame according to the invention, a simple and effective way to provide effective cooling of the battery cell is provided since the flow of coolant, and thus the flow of heat, within the channel thus provided is directed away from the battery cell for cooling, and thus the battery cell is cooled. A battery cell may be used in a battery module. One or more battery modules may be interconnected to form a battery or energy storage device. In an interconnection of multiple battery modules, the battery cells from a first battery module are electrically contacted and connected to battery cells from another battery module. The energy for driving an electric motor may be taken from a battery or energy storage unit, which may be used, for example, to drive an electrically powered vehicle.

The first housing frame may be a part of a housing of a first battery module. The second housing frame may be a part of a housing of a second battery module. The first housing frame and the second housing frame are connected to each other. Based on shape and material properties of the first housing frame and the second housing frame, a fluid-tight region is formed between the first housing frame and the second housing frame. For example, the first housing frame and the second housing frame may be formed by injection molding. A seal, for example a sealing lip, can be arranged in a connection region of the first housing frame with the second housing frame so that fluid tightness is ensured. The first housing frame may include latching tabs in the connection region. The second housing frame may comprise latching tabs corresponding to the latching lugs, so that when connected, the latching tabs of the second housing frame latch into the latching lugs of the first housing frame. The first housing frame and the second housing frame may be inserted into each other during connection.

The channel is adapted to allow a coolant to flow in the channel. The coolant is an electrically non-conductive coolant, such as transformer oil.

In order to establish electrical contact between battery cells, the battery cells comprise a positive pole and a negative pole. The battery cell can be arranged in the first housing frame so that a positive pole or a negative pole of the battery cell can be arranged in the channel. A further battery cell can also be arranged in the second housing frame, so that the positive pole or the negative pole of the further battery cell can also be arranged in the channel. The coolant can flow at least partially around the battery cells, thereby absorbing the heat of the battery cells and cooling the battery cells. The heated coolant can flow out of the fluid-tight region and be cooled down again, for example by means of a heat exchanger. The partially fluid-tight area can be connected to a coolant reservoir.

In one embodiment, the first housing frame encloses an interior space. A battery cell is disposed in the interior space and the battery cell extends at least partially into the fluid-tight region.

In another embodiment, the first housing frame comprises a battery cell holder. The battery cell holder is configured to hold the battery cell in the first housing frame. The battery cell holder may comprise a closed-cell material. For example, the battery cell holder may comprise a foamed material. The battery cell may be inserted into the battery cell holder, and the battery cell holder holds the battery cell in the first housing frame and accurately positions the battery cell in the first housing frame. As a result, positional tolerances of the battery cell in the first housing frame can be avoided. The battery cell holder may be arranged in the interior of the first housing frame. The first housing frame may be a battery module housing. For example, the battery cell holder may be overmolded around the battery cell, providing a seal so that the coolant cannot enter an area between the battery cell and the battery cell holder. The battery cell holder thereby displaces the coolant, and the coolant thereby flows exclusively in the channel.

In a further embodiment, one end face of the battery cell projects into the fluid-tight area of the first housing frame. The second housing frame comprises a further battery cell, which is arranged at the end face of the battery cell and the coolant flows directly around the end face of the battery cell and an end face of the further battery cell. The battery cell and the further battery cell may be round cells. In round cells, the positive terminals and negative terminals are arranged on the end faces of the battery cells, respectively. The end face of the battery cell and the end face of the further battery cell protrude into the fluid-tight region, so that the end faces of the battery cell and the further battery cell are cooled by the coolant flowing around them because the coolant absorbs the heat and carries it away from the battery cell and the further battery cell in the channel for cooling. The coolant thereby absorbs the heat from the battery cell and the further battery cell. For example, the end face of the battery cell and the end face of the further battery cell may be exposed from the battery cell holder so that direct contact of the coolant with the end faces is enabled, thereby increasing the dissipation of the heat and hence the cooling capacity as the end faces are in direct contact with the coolant. The battery cell and the further battery cell can be electrically contacted with each other via the end faces.

In a further embodiment, a contact element is welded onto the end face of the battery cell, which is set up to establish an electrical contact between the battery cell and the further battery cell, with the coolant flowing directly around the contact element. For example, the end face of the battery cell can be a negative terminal. A contact crown can be welded onto the negative terminal as a contact element. The contact crown comprises contact lugs which, in the event of electrical contacting, grip around the cell shell of the further battery cell. This measure not only cools the end faces of the battery cells due to the coolant flowing past, but also the contact element, which can also be strongly heated due to the direct contact with one of the end faces of the battery cells and the associated heat exchange and must therefore also be cooled.

In a further embodiment, a plurality of battery cells can be arranged in the interior of the first housing frame. Selective dimensioning of the partially fluid-tight area between the first housing frame and the second housing frame as a channel based on the number of battery cells and the expected maximum power dissipation ensures a low temperature difference between the plurality of battery cells. The plurality of battery cells can be electrically interconnected with a plurality of battery cells arrangeable in the second housing frame. The coolant can be pumped into the channel by a pump.

Depending on the dimensioning of the fluid-tight area, a higher pressure of the pump is required to achieve an optimum flow rate of the coolant. The larger the dimensioning of the fluid-tight area, the more surface area can be cooled on the battery cell and, if necessary, the contact element. The advantage of this measure is to prevent more rapid aging of the battery cells and to maintain a uniform current distribution between the battery cells, so that the battery cells have only a small temperature difference between them. For example, a temperature difference of 5 Kelvin should not be exceeded for battery cells connected in parallel. The flow rate of the coolant and thus the cooling capacity by the coolant thus depends, among other things, on the pressure of the pump and the dimensioning of the fluid-tight area.

In a further embodiment, the first housing frame comprises a coolant distributor, which is arranged to allow the coolant to flow into the channel in a uniformly distributed manner. The coolant distributor may be, for example, a manifold. The coolant manifold may include a main coolant inlet that supplies the coolant to a plurality of battery modules. Openings may be provided on each of the battery modules to allow coolant to flow from the main coolant inlet into the respective battery module. Likewise, a further coolant distributor may be arranged which allows coolant to flow out into a main coolant outlet via further openings on the respective battery modules.

In another embodiment, the channel comprises a coolant inlet configured to allow coolant to flow into the channel and the channel comprises a coolant outlet configured to allow coolant to flow out of the channel. The coolant inlet and the coolant outlet may be connection devices for hoses. The hoses may be connected to the coolant reservoir. The coolant inlet and the coolant outlet may also be openings. The openings may be connected to the coolant manifold.

Another aspect of the invention relates to a method of forming a channel with a provision of a first housing frame and a provision of a second housing frame. Subsequently, the first housing frame is connected to the second housing frame, whereby a partially fluid-tight area is formed between the first housing frame and the second housing frame, due to the shape and material properties of the first housing frame and the second housing frame, and forms the channel.

In one embodiment, the first housing frame comprises latching tabs and the second housing frame comprises latching lugs. The latching tabs and latching lugs allow the first housing frame and the second housing frame to latch together when connected.

In further embodiments, the first housing frame and the second housing frame may be mated together. To ensure tightness in the fluid-tight area, a sealing element, for example a sealing ring, can be attached to a connection point of the first housing frame with the second housing frame.

Connecting the first housing frame to the second housing frame can be automated within a manufacturing process.

In one embodiment, connecting the first housing frame to the second housing frame includes connecting a coolant inlet and a coolant outlet to the channel.

The fact that the channel is only created by joining the two housing frames ensures a high degree of tightness of the channel, so that no coolant can escape from the channel unintentionally. This means that the amount of coolant can be limited to the fluid-tight area and does not have to fill the entire interior of the battery modules, as is the case in known battery modules. Battery modules in which the channel is integrated can be manufactured with reduced weight and at lower cost.

BRIEF DESCRIPTION OF THE SEVERAL VIEWS OF THE DRAWINGS

Further advantageous features and details of the various embodiments of this disclosure will become apparent from the ensuing description of a preferred exemplary embodiment and with the aid of the drawings. The features and combinations of features recited below in the description, as well as the features and feature combination shown after that in the drawing description or in the drawings alone, may be used not only in the particular combination recited, but also in other combinations on their own, with departing from the scope of the disclosure.

Advantageous embodiments of the invention are explained below with reference to the accompanying figures, wherein.

DETAILED DESCRIPTION OF THE INVENTION

As used throughout the present disclosure, unless specifically stated otherwise, the term "or" encompasses all possible combinations, except where unfeasible. For example, the expression "A or B" shall mean A alone, B alone, or A and B together. If it is stated that a component includes "A, B, or C", then, unless specifically stated otherwise or infeasible, the component may include A, or B, or C, or A and B, or A and C, or B and C, or A and B and C. Expressions such as "at least one of" do not necessarily modify an entirety of the following list and do not necessarily modify each member of the list, such that "at least one of" A, B, and C" should be understood as including only one of A, only one of B, only one of C, or any combination of A, B, and C.

The figures are merely schematic representations and serve only to explain the invention. Identical or similarly acting elements are marked throughout with the same reference signs.

Figure 1:
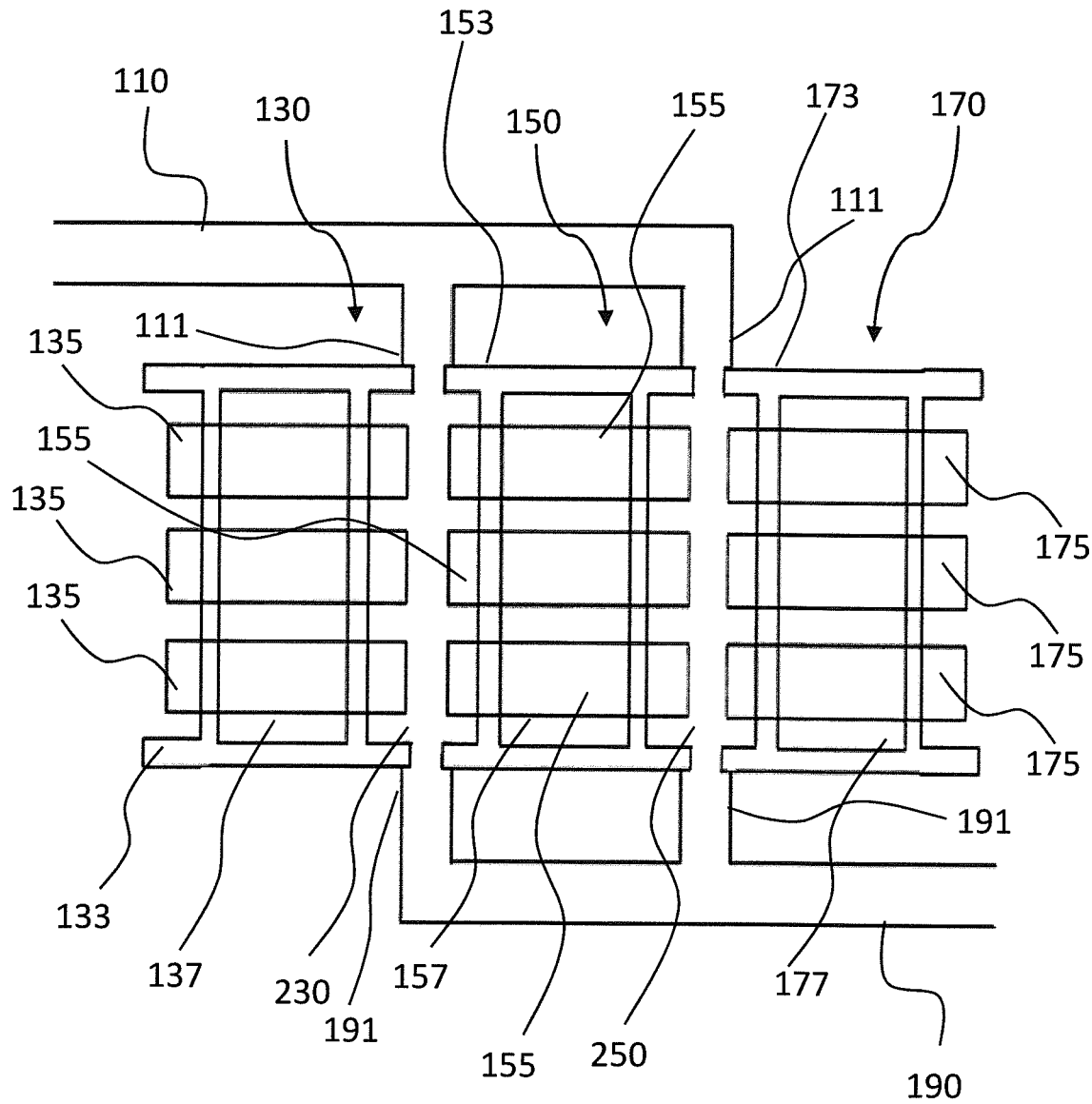
FIG. 1 depicts a channel for cooling at least one battery cell according to a first embodiment set out in a sectional view.

FIG. 1 depicts a channel for cooling at least one battery cell according to a first embodiment in a sectional view. Round cells 135, 155, 175 are used as battery cells in battery modules 130, 150, 170, respectively. The round cells 135, 155, 175 provide the energy required to drive an electric vehicle. Over the course of and by providing the energy, the round cells 135, 155, 175 heat up.

The battery modules 130, 150, 170 each comprise a battery module housing 133, 153, 173. The round cells 135, 155, 175 are held in the battery module housing 133, 153, 17 by a battery cell holder 137, 157, 177. The battery cell holder 137, 157, 177 simultaneously ensures that the round cells 135, 155, 175 are arranged with positional accuracy and avoids positional tolerances of the round cells 153, 155, 175 in the battery module 130, 150, 170. The round cells 135, 155, 175 are each inserted in such a way that their end faces project into a channel 230, 250. The channel 230, 250 is first made by connecting the battery module housings 133, 153, 173 and forms the fluid-tight region. A coolant flows through the channel 230, 250. The coolant thereby flows around the end faces of the round cells 153, 155, 175 and absorbs heat from the round cells 135, 155, 175. As a result, the round cells 135, 155, 175 are cooled. The duct 230, 250 each comprises a coolant inlet 111 and a coolant outlet 191 which are formed as hoses. The coolant inlets 111 and the coolant outlets 191 are each connected to a coolant distributor 110, 190. Via the coolant distributors 110, 190, the coolant flows into the channel 230 and out of the channel 250 in a uniformly distributed manner. The coolant flows in via a pump (not shown in FIG. 1).

Figure 2:
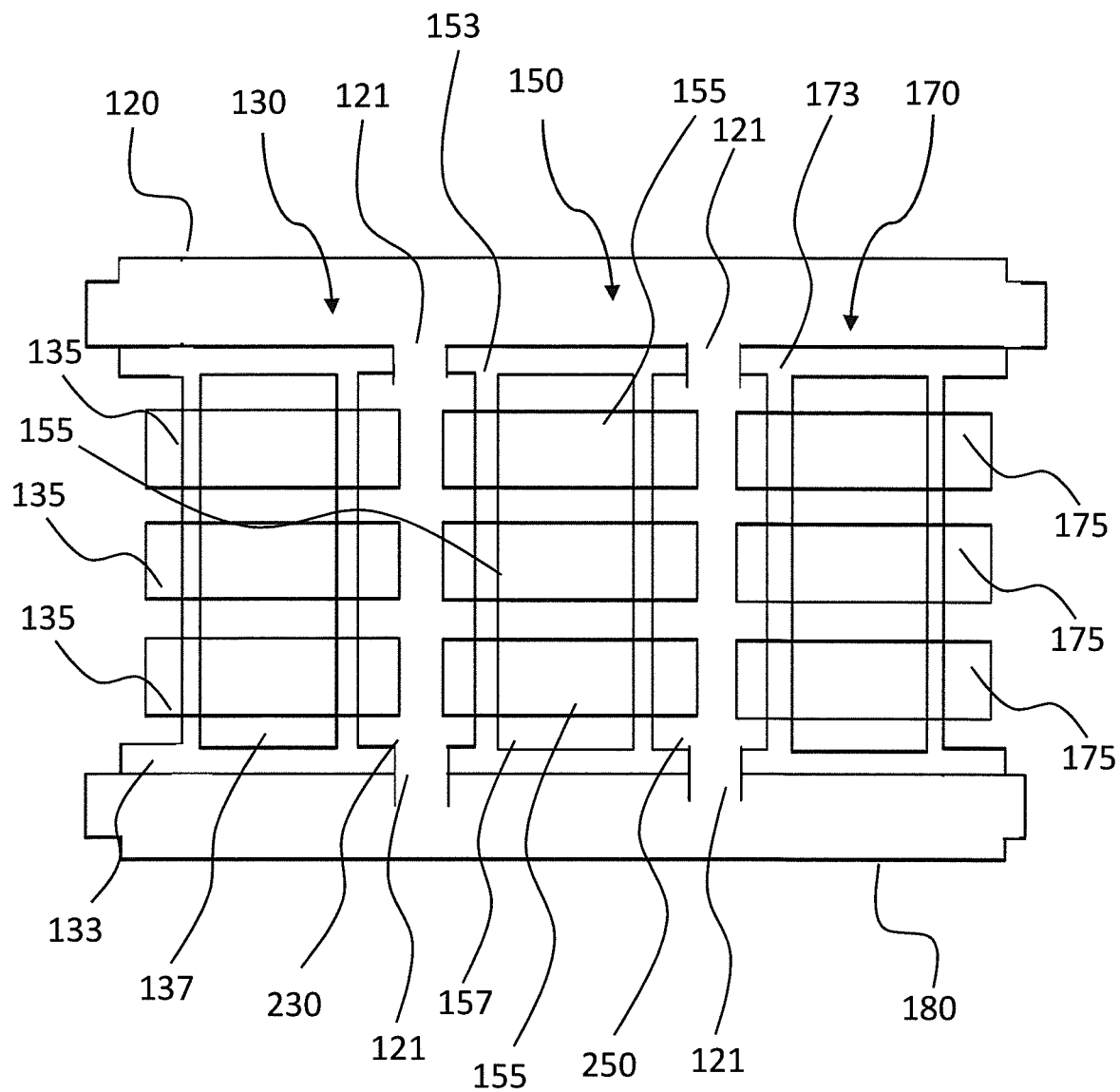
FIG. 2 depicts the channel for cooling the at least one battery cell according to a second embodiment set out in a sectional view.

FIG. 2 shows the channel according to a second embodiment example in a sectional view. According to the second embodiment example, a coolant manifold 120, 180 is already integrated in the battery modules 130, 150, 170. By connecting the individual battery module housings 133, 153, 173, not only the channel 230, 250 is produced, but also the coolant distributor 120, 180. Due to the fact that the coolant distributor 120, 180 is already integrated in the battery modules 130, 150, 170, an increased tightness is created so that the coolant cannot leak out of the battery module housing 133, 153, 173. For example, the battery module housing 133, 153, 173 can be manufactured in one piece by means of an injection molding process.

The coolant manifold 120 includes openings 121 for coolant to flow into the channel 230, 250. The coolant manifold 180 includes further openings 121 for coolant to flow out of the channel 230, 250. The coolant is pumped into the coolant manifold 120 and enters the channel 230, 250 via the openings 121. Within the duct 230, 250, the coolant flows around the end faces of the round cells 135, 155, 175 and flows out of the duct 230, 250 into the coolant distributor 180 via the further openings 121. In order to achieve an evenly distributed inflow and outflow of the coolant, the sum of all cross sections of the openings 121 must be at least as large as the cross section of the respective coolant distributors 120, 180.

Since the devices and processes described in detail above are exemplary embodiments, they can be modified to a large extent in the usual way by a person skilled in the art without leaving the field of the invention. In particular, the mechanical arrangements and the proportions of the individual elements to each other are simply exemplary. Having described some aspects of the present disclosure in detail, it will be apparent that further modifications and variations are possible without departing from the scope of the disclosure. All matter contained in the above description and shown in the accompanying drawings shall be interpreted as illustrative and not in a limiting sense.

What is claimed is:

1. A channel for cooling at least one battery cell, comprising:
   a first housing frame and a second housing frame, wherein the first housing frame is connected to the second housing frame,
   a partially fluid-tight region formed and arranged between the first housing frame and the second housing frame by the shape and material properties of the first housing frame and the second housing frame, wherein the partially fluid-tight region form the channel,
   at least one coolant distributor configured and arranged to facilitate coolant flow into the channel,
   wherein the channel is configured and arranged to allow coolant to flow through the channel, wherein the at least one coolant distributor comprises two coolant distributors wherein one of the two coolant distributors is configured and arranged to receive coolant from the channel, and wherein the channel further comprises an opening comprising a cross section a sum of size of which is at least as large a cross section of the two coolant distributors.

2. The channel according to claim 1, wherein:
the first housing frame is configured to enclose an interior space; and
the battery cell is arranged in the interior space and extends at least partially into the partially fluid-tight region.

3. The channel according to claim 1, wherein the first housing frame comprises a battery cell holder configured and arranged to hold the battery cell in the first housing frame.

4. The channel according to claim 1, wherein:
an end face of the battery cell projects into the partially fluid-tight region of the first housing frame; and
the second housing frame comprises a further battery cell arranged on an end face of the battery cell such that the coolant flows directly around the end face of the battery cell and an end face of the further battery cell.

5. The channel according to claim 4, wherein a contact element is welded onto the end face of the battery cell, the contact element configured to establish an electrical contact between the battery cell and the further battery cell such that the coolant flows directly around the contact element.

6. The channel according to claim 1, further comprising a plurality of battery cells arranged in the interior space of the first housing frame and wherein a dimensioning of the partially fluid-tight area between the first housing frame and the second housing frame as a channel is configured to enable a low temperature difference between the plurality of battery cells.

7. The channel according to claim 1, wherein:
the channel further comprises a coolant inlet configured and arranged to enable the coolant to flow into the channel; and
the channel further comprises a coolant outlet arranged to allow the coolant to flow out of the channel.

8. The channel according to claim 1, wherein the two coolant distributors are coolant manifolds.

9. A duct comprising:
a channel for cooling at least one battery cell, comprising a first housing frame and a second housing frame, wherein the first housing frame is connected to the second housing frame, a partially fluid-tight region formed and arranged between the first housing frame and the second housing frame by the shape and material properties of the first housing frame and the second housing frame, wherein the partially fluid-tight region form the channel, and wherein the channel is configured and arranged to allow a coolant to flow through the channel, and wherein the first housing frame comprises a coolant manifold arranged to allow the coolant to flow into the duct in a uniformly distributed manner; and wherein the channel further comprises an opening comprising a cross section a sum of size of which is at least as large a cross section of the coolant manifold.

10. The duct according to claim 9, further comprising a second coolant manifold configured and arranged to receive coolant from the channel.

11. A method of forming a channel comprising a first housing frame and a second housing frame, the method comprising the steps of:
connecting the first housing frame to the second housing frame;
forming a partially fluid-tight region between the first housing frame and the second housing frame by the shape and material properties of the first housing frame and the second housing frame such that the partially fluid-tight region form the channel:
arranging a coolant distributor in contact with the channel such that a coolant in the coolant distributor flows into the channel, and
wherein the channel is configured and arranged to allow the coolant to flow through
the channel; and
wherein the channel comprises an opening comprising a cross section a sum of size of which is at least as large as a cross section of the coolant distributor.

12. The method of claim 11, wherein the step of connecting the first housing frame to the second housing frame further comprises the step of connecting a coolant inlet and a coolant outlet to the channel.

13. The method according to claim 11, further comprising the steps of arranging another coolant distributor in contact with the channel such that fluid in the channel flows into the another coolant distributor.

14. The method according to claim 13, wherein the coolant distributor is a coolant manifold.

* * * * *